US006788896B1

(12) United States Patent
Wang et al.

(10) Patent No.: US 6,788,896 B1
(45) Date of Patent: Sep. 7, 2004

(54) TECHNIQUE FOR ALL-OPTICAL PACKET SWITCHING

(76) Inventors: Guo-Qiang Wang, 175 Longshire Circle, Nepean, ON (CA); Dominic Goodwill, 160 Yoho Drive, Kanata, ON (CA), K2M 2V4; Paul Toliver, 216 Riveredge Rd., Tinton Falls, NJ (US) 07724; Kihong Kim, 1 Langford Cr., Kanata (CA), K2K 2N4

( * ) Notice: Subject to any disclaimer, the term of this patent is extended or adjusted under 35 U.S.C. 154(b) by 675 days.

(21) Appl. No.: 09/745,867

(22) Filed: Dec. 26, 2000

(51) Int. Cl.[7] .............................................. H04J 14/00
(52) U.S. Cl. ............................ 398/51; 398/53; 398/54
(58) Field of Search .......................... 398/32, 45, 49, 398/51, 53, 57, 54, 166; 370/389, 392, 395.1, 397, 399, 395.32

(56) References Cited

U.S. PATENT DOCUMENTS

| 5,430,715 | A | * | 7/1995 | Corbalis et al. | ............. | 370/392 |
| 6,032,190 | A | * | 2/2000 | Bremer et al. | ............. | 709/238 |
| 6,519,062 | B1 | * | 2/2003 | Yoo | ............. | 398/49 |
| 6,545,781 | B1 | * | 4/2003 | Chang et al. | ............. | 398/51 |
| 6,657,757 | B1 | * | 12/2003 | Chang et al. | ............. | 370/471 |

OTHER PUBLICATIONS

"A Proof-of-Concept, Ultra-low Latency Optical Label Switching Testbed Demonstration for Next Generation Internet Networks," by G.K. Chang et al., Proceedings of the Optical Communication Conference, Baltimore, Maryland, WDS, Mar. 2000, pp. 56–58.

"All-Optical Label Swapping with Wavelength Conversion for WDM-IP Networks with Subcarrier Multiplexed Addressing," by D.J. Blumenthal et al., IEEE Photonics Technology Letters, vol. 11, No. 11, Nov. 1999.

* cited by examiner

Primary Examiner—Jason Chan
Assistant Examiner—Dzung Tran
(74) Attorney, Agent, or Firm—Hunton & Williams

(57) ABSTRACT

A technique for switching all-optical packet switching is disclosed. In one embodiment, the technique is realized by receiving at least one data packet over a network, disassociating a payload portion from a first header in the data packet, forming a second header based on a first information in the first header, associating the payload portion with the second header to form a modified packet and switching the modified packet based on a second information contained in the first header.

30 Claims, 6 Drawing Sheets

TECHNIQUE FOR ALL-OPTICAL PACKET SWITCHING

FIELD OF THE INVENTION

The present invention relates generally to switches and, more particularly, to a technique for all-optical packet switching.

BACKGROUND OF THE INVENTION

In fiber optic technology, data may be transmitted through fiber optic cables in the form of light waves. Fiber optic cables are thinner and lighter then traditional metal communication cables, and have greater bandwidth then metal cables, allowing fiber optic cables to carry more data. Fiber optic cables also allow data to be transmitted in digital form rather than in analog form, making fiber optic cable more suitable for carrying computer data. Fiber optic cables are also less susceptible to interference than metal cables.

Thus, fiber optics has become a popular technology for network applications such as local area networks and communications network. Fiber optic networks may carry data in the form of optical data packets, and use switches to forward the optical data packets between networks segments.

Optical packets in fiber optic networks may include an optical packet header portion and an optical packet payload portion. In a typical optical packet switching system, the system may be required to "read" and "write" the optical packet header for each optical data packet electronically. Thus, the optical packet payload for each optical packet needs to be delayed until its associated packet header has been electronically processed.

In a multi protocol label switching ("MPLS") switch network, a "shim" header is added to each internet protocol ("IP") packet. The shim header is used as a "label". Each MPLS switch may read and write this label and switch the IP packets based on the value of the label. The shim header may include at least two parts, a label and a time to live ("TTL"). The label part of the header is used for switching navigation purposes and the TTL portion of the header is used to avoid an infinite loop when the packet is being transmitted through a network. When the value of TTL drops to zero, the packet will be dropped from transmission in the network.

An optical to electrical conversion must be performed on the header at the switch, so that the header may be read. Then, an optical to electrical conversion must be performed on the header so that the header may be transmitted through the fiber optic network with the payload. The optical to electrical to optical conversion of the optical packet header during processing in a switch slows down switching speed and adds to system cost.

In view of the foregoing, it would be desirable to provide a technique for all-optical packet switching which overcomes the above-described inadequacies and shortcomings. More particularly, it would be desirable to provide a technique for all-optical packet switching in an efficient and cost effective manner.

SUMMARY OF THE INVENTION

According to the present invention, a technique for all-optical packet switching is provided. In one embodiment, the technique is realized by receiving at least one data packet over a network, disassociating a payload portion from a first header in the data packet, forming a second header based on a first information in the first header, associating the payload portion with the second header to form a modified packet and switching the modified packet based on a second information contained in the first header.

In accordance with other aspects of the present invention, the optical packet header may include a label. The label may include destination information that is pre-calculated before the optical packet is transmitted from its origin. The switching fabric of the switch may be controlled by the information contained in the label of the optical packet. The switch may further comprise a pre-configured signaling protocol to change the label of the optical packet header.

In accordance with further aspects of the present invention, the technique for switching includes an all-optical packet switching apparatus. The apparatus may include an optical pilot tone eraser, a photo diode, an electrical frequency detector, a switch controller, a modulation unit, at least one fiber delay and a network element.

The optical pilot tone eraser may be configured to receive at least one data packet and disassociate a header from a payload of the data packet. The photo diode may be coupled to receive the header of the data packet from the optical pilot tone eraser and convert the header to an electrical control signal. The electrical frequency detector may be coupled to receive an input from the photo diode.

The switch controller may be coupled to receive an input from the electrical frequency detector. The modulation unit may include a synthesizer which may be coupled to receive an input from the switch controller and output a modulated header signal. The at least one fiber delay may be coupled to receive the payload signal from the optical pilot tone eraser and output a delayed payload signal.

The network element may be coupled to receive inputs from the modulation unit, the fiber delay and the switch controller to associate the header to the payload to form a modified data packet, switch the modified data packet, and output the modified data packet to an optical network interface.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
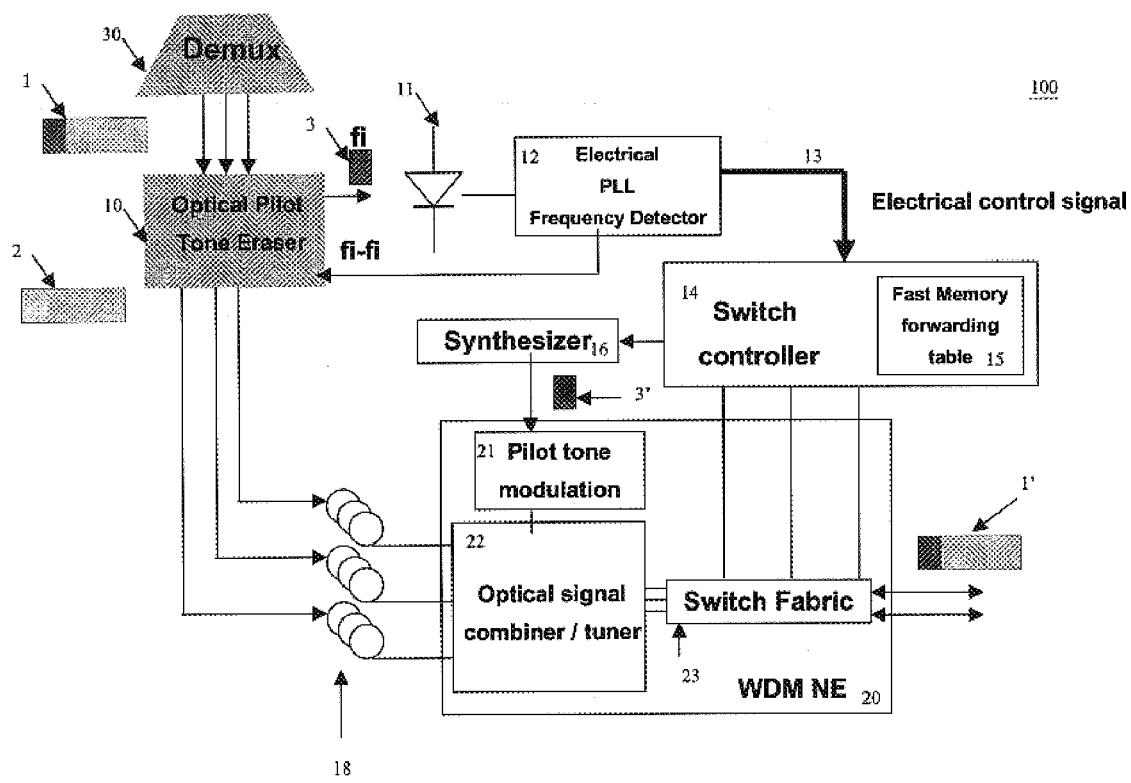
FIG. 1 is a block diagram illustrating one embodiment of all-optical packet switching system in accordance with the present invention.

Referring to FIG. 1, there is shown a block diagram illustrating one embodiment of an all-optical packet switching system. System 100 includes an optical pilot tone eraser 10, an optical to electrical conversion element 11, an electrical frequency detector 12, a switch controller 14, a synthesizer 16, a switching network element 20 and at least one fiber delay element 18. The system 100 may also include a demux 30.

An optical packet 1 includes an optical packet payload 2 and an optical packet header 3. An optical packet 1 may be received at optical pilot tone eraser 10. The optical pilot tone eraser 10 may act as an optical splitter to split the optical packet header 3 from the optical packet payload 2.

Figure 2:
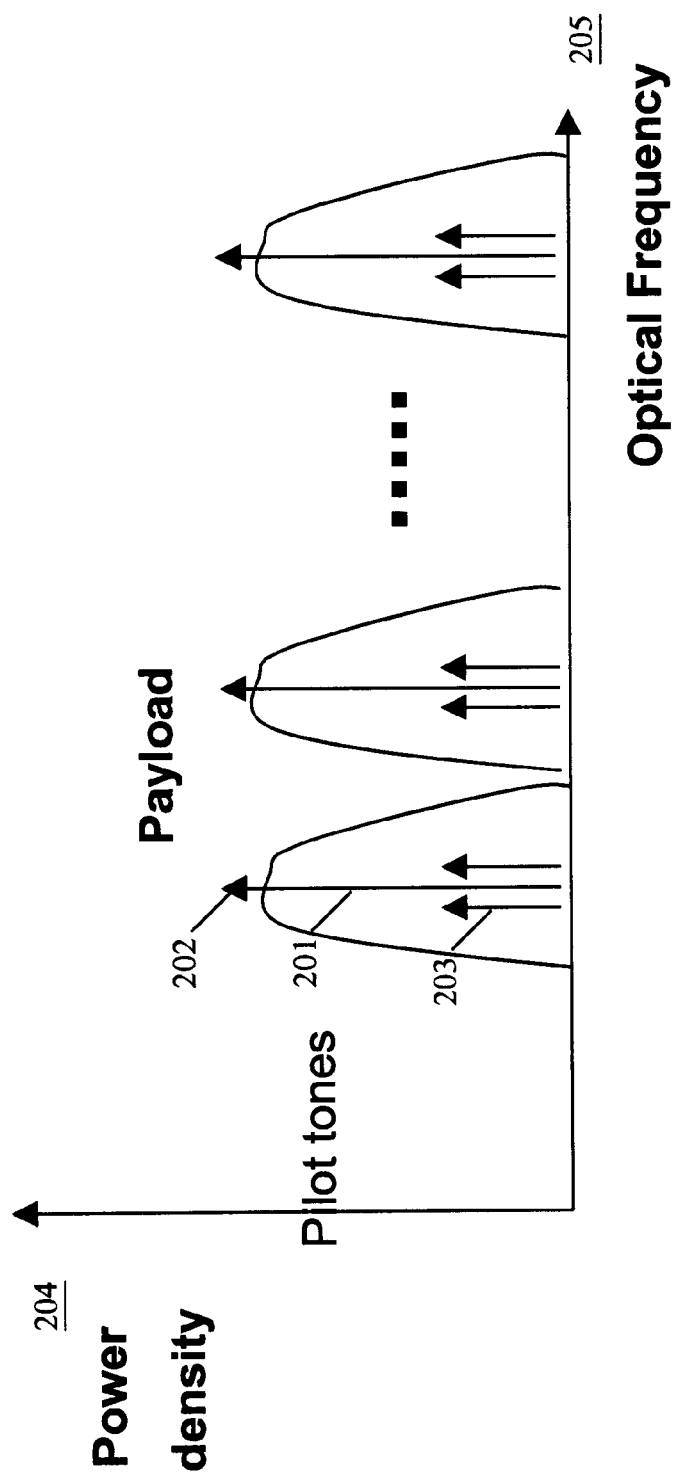
FIG. 2 is a graphical representation illustrating one embodiment of optical packets in a fiber optic network.

FIG. 2 is a graphical representation illustrating one embodiment of optical packets in a fiber optic network. An optical packet 201 may include a payload signal 202 and pilot tones 203. Payload signal 202 has a first power density 204 at a first optical frequency 205. Pilot tones 203 represent the optical packet header signal. The pilot tones have a second power density 204 less than the first power density at optical frequency 205 close to the optical frequency of payload signal 202.

Referring to FIG. 1, after the optical packet header 3 is separated from the optical packet payload 2, the optical packet header may be transmitted to an optical to electrical conversion element 11. The optical to electrical conversion element may comprise a photo diode 11.

The electrical signal resulting from the optical to electrical conversion at element 11 may be transmitted to electrical frequency detector 12. The electrical frequency detector may comprise a phase-locked loop ("PLL"). The output of PLL 12 is an electrical control signal 13 which may be input into switch controller 14. A feedback signal from PLL 12 may be input into optical pilot tone eraser 10.

The feedback signal may be used to provide the "eraser" function for the packet header. The feedback signal may act as a subtrahend. The feedback signal may have a magnitude that is exactly the same as the magnitude at the frequency of the incoming packet header but with the opposite sign. Thus, a summation function inside the optical pilot tone eraser 10 results in a sum of "0" for the header after the optical pilot tone eraser 10. Thus, an eraser function for the packet header is performed.

Switch controller 14 may comprise a fast memory forwarding table 15. The fast memory forwarding table 15 may separate the electrical control signal 13 into four portions. The separated electrical control signal 13 may include an incoming label representing a searching index, an ingress port identifier identifying the ingress port at which packet 1 entered the switch 100, an egress port identifier identifying from which egress port optical packet 1 should be transmitted and an outgoing label representing the next destination for the optical payload 2 and, if necessary, the new optical transmission wavelength for the optical packet header 3.

The information contained in the optical packet header 3 may be pre-calculated before the packet is transmitted from its origin.

The switch controller 14 may use the information in fast memory forwarding table 15, derived from the electrical control signal 13, to control switch fabric 23. The switch controller may also forward the new optical payload header including the new labels to synthesizer 16. Synthesizer 16 may convert the electrical signal of the optical packet header to an optical signal to produce optical packet header 3'. The synthesizer 16 may provide an electrical frequency output (tone) with static input from switch controller 14. For example, if the switch controller 14 outputs a set of DC electrical values, the output signal of the synthesizer would be a pre-defined frequency (tone). The synthesizer 16 may then forward new optical packet header 3' to pilot tone modulation module 21.

Pilot tone modulation module 21 may work with synthesizer 16 to modulate the electrical pilot signal into the new optical packet header 3'.

The new optical packet header 3' may be forwarded from pilot tone modulation module 21 to optical signal combiner/tuner 22. At the optical signal combiner/tuner, the new optical packet header 3' may be associated with optical payload 2. While the optical packet header 3 is processed to determine the ingress/egress ports or switching paths through which optical packet payload 2 may be switched, optical packet payload 2 may be routed through fiber delay 18.

Fiber delay 18 may include optical fiber or optical storage means to delay the optical payload 2 until the switching path has been determined. The fiber delay 18 may include a fixed delay and/or programmable delay. The fixed delay may correspond to the processing time for optical packet header 3. The programmable delay may be determined by optical signal tuner 22. The optical signal tuner may delay receiving the payload 2 if there is contention from another payload portion of another optical packet routed to go through the same egress port as payload 2.

The optical packet payload 2 and the new optical packet header 3' may be combined in optical signal combiner 22. If there is contention from another payload routed through the same egress port, optical signal tuner 22 may change one of the payload signals 2 and/or is corresponding optical packet header 3' to a different optical transmission wavelength. The optical signal tuner may comprise tunable laser technology.

The modified optical packet 1' may be switched through switch fabric 23 and transmitted to its next destination. The next destination may comprise either an optical user network interface, if the next destination is the optical packet's 1' final destination, or an optical network interface, if the next destination is not the optical packet's 1' final destination.

Figure 3:
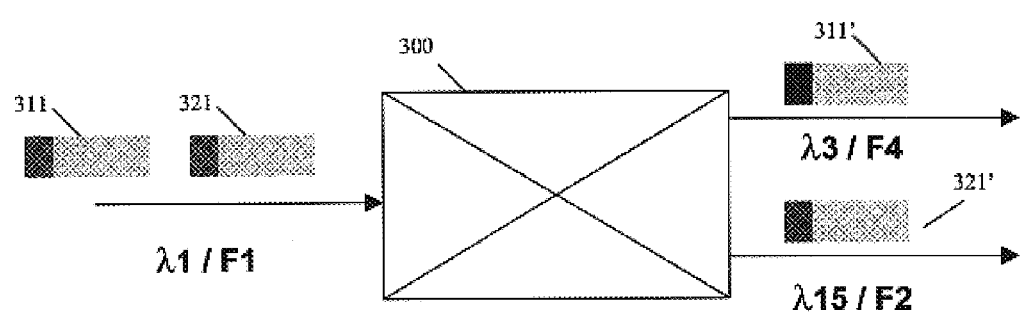
FIG. 3 is a block diagram illustrating one embodiment of an all-optical packet switch receiving a plurality of packets as an input.

FIG. 3 is a block diagram illustrating one embodiment of an all-optical switching system receiving a plurality of packets through the same fiber and frequency. All-optical switching system 300 may receive optical packets 311, 321 at an optical transmission wavelength of λ1 through fiber 1.

Optical packet 311 and optical packet 321 may each be routed through the all-optical switching system 300 as described with reference to FIG. 1 above. Optical packets 311, 312 may be routed to the appropriate fiber and converted to an optical transmission wavelength depending on the information contained in their corresponding optical packet headers. Thus, in the example shown, optical packet 311 may be routed to fiber 4 and re-coded to an optical transmission wavelength of λ3. Optical packet 321 may be routed to fiber 2 and re-coded to an optical transmission wavelength of λ15.

The re-coding of the payload signal and the header performed in optical signal tuner 22 may be performed before switch fabric 23 or after switch fabric, depending on the implementation. The routing paths for each packet 311, 321 may be pre-calculated and a signaling protocol such as, for example, wavelength distribution protocol ("WDP") may be used to pre-configure the label on each of the switches 100 along the path. A signaling protocol within switch controller 14 may be configured to convert all optical packet headers 3 having a first type of optical packet label to a predetermined second optical packet label.

Figure 4:
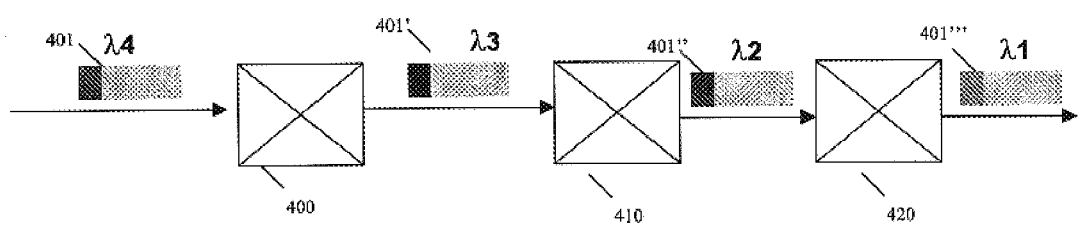
FIG. 4 is a block diagram illustrating one embodiment of a network including a plurality of switches in accordance with the present invention.

FIG. 4 is a block diagram illustrating one embodiment of a portion of a network including a plurality of switches. A network may include switches 400, 410, 420. Four switches 400, 410, 420 are shown for illustration purposes only. A network may have more or fewer switches, depending on the implementation.

An optical packet 401 entering a switch 400 may having an optical transmission wavelength of λ4. All-optical packet switching system 400 may convert the optical transmission frequency at which optical packet 401 is transmitted to λ3 during switching and transmit the switched packet 401' to switch 410.

All-optical switching system 410 may convert the optical transmission frequency at which packet 401' is transmitted to an optical transmission wavelength λ2 during switching. Switch 410 may then transmit switched packet 401" to switch 420.

All-optical switching system 420 may convert the optical transmission wavelength λ2 of packet 401" to an optical transmission wavelength of λ1 during switching of optical packet 401" to optical packet 401'''.

If the destination after all-optical switch 420 is the final destination in the network for optical packet 401''', optical packet 401''' may be reconverted to an electrical packet format and the optical label of optical packet 401''' may be remapped back to the IP address.

The label remapping from the optical address domain (optical WDM network) to the electrical address domain (IP packet network) may be performed by removing the optical pilot signal 203, converting the optical payload signal 202 to IP packets, and assigning a destination IP address to each packet. The relationship between the optical label and the IP address may be determined by a wavelength signaling protocol at the time the optical path is developed.

Figure 5:
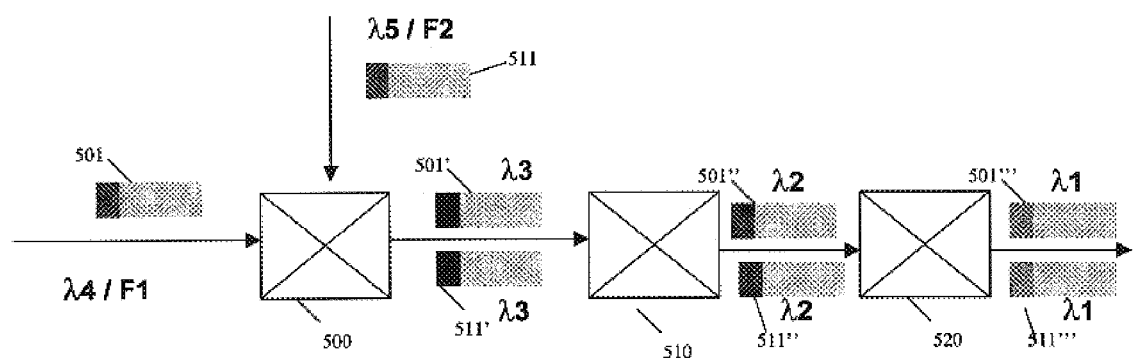
FIG. 5 is a block diagram illustrating one embodiment of a network including a plurality of switches having a plurality of input fibers.

FIG. 5 is a block diagram illustrating one embodiment of a portion of a network comprising a plurality of all-optical switches. The network is illustrated having three switches 500, 510, 520. As described above with reference to FIG. 4, the network may have more or fewer switches.

Switching system 500 is shown, for illustration purposes, as receiving a plurality of input fibers F1, F2. All of the switches 500, 510, 520 may include a plurality of input and output fibers.

At all-optical switching system 500, optical packets 501 and 511 are received at ingress ports of the switching system 500. Optical packet 501 is received, in the example shown, at an optical transmission wavelength of λ4 through a first fiber, F1. Optical packet 511 is received at an optical transmission wavelength of λ5 through a second fiber, F2.

If the switching system 500 at switching controller 14 determines that 511 and 501 are routed to the same destination, switching system 500 may switch packets 501 and 511 to the same optical transmission wavelength λ3. Thus, optical packet 501 and optical packet 511 may be switched by all-optical switching system 500 so that switched packet 501' and switched packet 511' are both transmitted from optical switching system 500 at an optical transmission wavelength of λ3 through the same output fiber. Further, switched packet 501' and 511' will continue to be switched and transmitted at the same optical transmission wavelength and through the same fiber.

Thus, for example, all-optical switching system 510 may switch optical packet 501' and optical packet 511' to optical packet 501" and optical packet 511". Optical packets 501" and 511" may be transmitted at an optical transmission wavelength of λ2. At all-optical switching system 520, optical packet 501" and optical packet 511" may be switched to optical packet 501''' and optical packet 511''', and transmitted at the same optical transmission wavelength of λ1.

Figure 6:
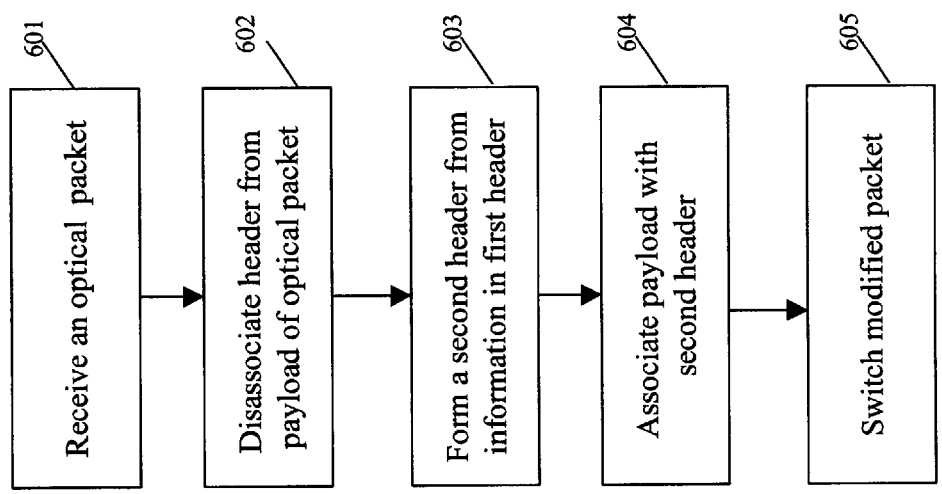
FIG. 6 is a flow diagram illustrating one embodiment of a method for switching packets in an optical switch.

FIG. 6 is a flow diagram illustrating one embodiment of a method for switching packets in an optical switch. At step 601, a packet may be received in the optical switch 100. At step 602, the header of the packet may be disassociated from the payload of the packet. At step 603, a second header 3' may be formed based on information contained in the first header 3. At step 604, the payload 2 may be associated with the second header 3'. At step 605, the modified packet 1' may be switched.

At step 601, the all-optical switch 100 may receive an optical packet 1 including a payload 2 and a header 3. The optical switch 100 may receive one or more packets. The optical packet may be received at a first optical transmission wavelength λ4. The optical packet may be received over an optical fiber F1. If a plurality of optical packets 1 are received, the optical packets may all be received over one optical fiber or a plurality of optical fibers.

At step 602, the header 3 is disassociated from the payload 2 as described above with reference to FIG. 1. The optical header 3 may be converted into an electrical control signal 13 using an optical to electrical converter 11.

At step 603, information contained in the optical packet header 3 may be used to form a second optical header 3'. The optical header 3 may include a label containing routing information for the optical packet 3, an identification of the ingress port of the optical packet 1 in the switch 100, information identifying which egress port the optical packet 1 should be switched to, and information indicating an output label for the optical packet header 3. The output label for the optical packet header 3 may be determined by a pre-configured signaling protocol. The pre-configured signaling protocol may determine the outgoing label for the optical packet header 3 based on the optical frequency of the pilot tone 203 of the optical packet header 3. The pre-configured signaling protocol may convert all optical packet headers having a first optical transmission frequency or wavelength to a second predetermined optical transmission wavelength.

At step 604, the second header 3' may be associated with the payload 2. The payload 2 may be delayed in a fiber delay 18 until the second header 3' is ready to be associated with the payload 2. The second header 3' may be converted from an electrical signal to an optical signal before being associated with payload 2 to form the modified packet 1'.

The optical transmission wavelength of the modified packet 1' may be converted from a first optical transmission wavelength at which optical packet 1 was received such as, for example, λ4, to a second optical transmission wavelength, such as, for example, λ3. The modified packet transmission wavelength may be changed due to a second optical data packet payload 2 waiting to use the same egress port at the same frequency as the first optical data packet 1. Converting the wavelength of the modified packet 1 may occur before or after switching the modified packet.

At step 605, the modified packet 1' may be switched to be transmitted through the appropriate egress port and fiber.

As described above with reference to FIG. 3, if two optical data packets 311, 321 are received at the same optical wavelength λ1, and network address information contained in the optical header label 3 of optical packet 311 does not match the network address information contained in the optical label of the optical packet 321, the optical transmission wavelength of one or both of the optical packets 311, 321 may be changed so that modified optical packets 311', 321' are transmitted at different wavelengths, such as optical transmission wavelength λ3 and optical transmission wavelength λ15.

With reference to FIG. 5, two optical data packets 501, 511 may be received over different optical transmission wavelengths at optical switch 500. If the network destination information contained in the optical packet header 3 of optical packet 501 matches the network address information contained in the optical packet header 3 of optical data packet 511, modified optical packet 501' and modified optical packet 511' may be transmitted over the same optical wavelength. In the example in FIG. 5, optical packet 501 is received at an optical transmission frequency of λ4 and optical packet 511' is received at an optical transmission wavelength of λ5. After being switched at all-optical packet switch 500, modified optical packet 501' and modified optical packet 511' may be transmitted at the same optical transmission wavelength λ3.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for switching packets in an optical switch, the method comprising the steps of:
   receiving a data packet signal over a network, the data packet signal having a first header signal and a payload signal;
   disassociating the payload signal from the first header signal in the data packet signal by summing the data packet signal and a feedback signal to remove the first header signal from the data packet signal, the feedback signal having a magnitude that is substantially equal and opposite to a magnitude of the first header signal;
   forming a second header signal based on first information in the first header signal;
   associating the payload signal with the second header signal to form a modified packet signal; and
   switching the modified packet signal based on second information in the first header signal.

2. The method of claim 1 further comprising transmitting the modified packet signal to a network destination.

3. The method of claim 1 wherein the data packet signal represents an optical data packet.

4. The method of claim 1 wherein data of the data packet signal is received at a first optical transmission wavelength and the method further comprises converting the wavelength at which the data of the data packet signal is transmitted to a second optical transmission wavelength.

5. The method of claim 4 wherein converting the wavelength is performed after switching the modified packet signal.

6. The method of claim 4 wherein converting the wavelength is performed before switching the modified packet signal.

7. The method of claim 1 wherein forming the second header signal comprises converting a first optical transmission wavelength of the first header signal to a second optical transmission wavelength.

8. The method of claim 1 wherein the first header signal comprises a label.

9. The method of claim 1 wherein the first information comprises network destination information.

10. The method of claim 9 wherein receiving the data packet signal over a network comprises receiving a first data packet signal at a first optical transmission wavelength and a second data packet signal at a second optical transmission wavelength,
   the method further comprising converting the transmission wavelength of the first data packet signal to a third optical transmission wavelength and converting the transmission wavelength of the second data packet signal to the third optical transmission wavelength if network destination information of the second data packet signal substantially matches network destination information of the first data packet signal.

11. The method of claim 1 wherein the switching the modified packet signal comprises determining which egress port of a switch to route the payload signal through based on the second information in the first header signal.

12. The method of claim 11 wherein the first information comprises network destination information and receiving the data packet signal over a network comprises receiving at least two data packet signals over a network at a first optical transmission wavelength,
   the method further comprising converting the transmission wavelength of a first data packet signal of the at least two data packet signals to a second optical transmission wavelength if network address information of a second data packet signal does not match network address information of the first data packet signal and the egress port of the first data packet signal matches the egress port of the second data packet signal.

13. The method of claim 1 wherein the first information comprises a first optical transmission frequency of the first header signal and forming the second header signal further comprises using a pre-configured signaling protocol to change the first optical transmission frequency of the first header signal to a predetermined second optical transmission frequency.

14. The method of claim 1 wherein the first information comprises pre-calculated routing information for the data packet signal.

15. The method of claim 1 further comprising delaying the payload signal until the second header signal is ready to be associated with the payload signal.

16. An apparatus for switching packets in an optical switch, the apparatus comprising:

an optical pilot tone eraser to receive a data packet signal and disassociate a header signal from a payload signal of the data packet signal;

a photo diode coupled to receive the header signal of the data packet signal from the optical pilot tone eraser and convert the header signal to an electrical control signal;

an electrical frequency detector coupled to receive an input from the photo diode;

a switch controller coupled to receive an input from the electrical frequency detector;

a modulation unit comprising a synthesizer coupled to receive an input from the switch controller and output a modulated header signal;

at least one fiber delay coupled to receive the payload signal from the optical pilot tone eraser and output a delayed payload signal; and a network element coupled to receive inputs from the modulation unit, the fiber delay and the switch controller to associate the header signal with the payload signal to form a modified data packet signal, switch the modified data packet signal, and output the modified data packet signal to an optical network interface.

17. The apparatus of claim 16 further comprising a demultiplexer to receive an optical signal comprising a plurality of optical packets and to output separated optical packets to the pilot tone eraser.

18. The apparatus of claim 16 wherein the network element comprises a switch fabric coupled to receive an input from the switch controller to direct switching and switch optical packets.

19. The apparatus of claim 16 wherein the modulation unit further comprises a pilot tone modulation unit in the network element.

20. The apparatus of claim 16 wherein the network element further comprises an optical signal combiner to combine the modulated header signal and the payload signal.

21. The apparatus of claim 16 wherein the network element further comprises an optical tuner to convert a transmission wavelength of one of the payload signal and the modified data packet signal from a received transmission wavelength to an output transmission wavelength.

22. The apparatus of claim 21 wherein the optical tuner is coupled to the fiber delay to control the delay of the payload signal.

23. The apparatus of claim 21 wherein the optical tuner comprises a tunable laser.

24. The apparatus of claim 16 wherein the switch controller comprises a fast memory forwarding table to separate the input received from the electrical frequency detector into a plurality of portions.

25. The apparatus of claim 16 wherein the electrical frequency detector comprises a phase-locked loop.

26. The apparatus of claim 16 wherein the optical pilot tone eraser receives a feedback signal from the electrical frequency detector to disassociate the header signal from the payload signal.

27. The apparatus of claim 26 wherein the optical pilot tone eraser comprises a summing function to sum the feedback signal and the data packet signal to disassociate the header signal from the data packet signal.

28. The apparatus of claim 26 wherein the feedback signal has a magnitude substantially equal and opposite to a magnitude of the header signal.

29. An apparatus for switching packets in an optical switch comprising:

a receiver that receives a data packet signal over a network, the data packet signal having a first header signal and a payload signal;

an optical pilot tone eraser to disassociate the payload signal from the first header signal in the data packet signal by summing the data packet signal and a feedback signal, the feedback signal having a magnitude substantially equal and opposite to a magnitude of first header signal; and a network element that forms a second header signal based on first information in the first header signal, associates the payload signal with the second header signal to form a modified packet signal, and switches the modified packet signal based on second information in the first header signal.

30. An apparatus for switching packets in an optical switch comprising:

means for receiving a data packet signal over a network, the data packet signal having a first header signal and a payload signal;

means for disassociating the payload signal from the first header signal in the data packet signal by summing the data packet signal and a feedback signal, the feedback signal having a magnitude substantially equal and opposite to a magnitude of the first header signal of the data packet signal;

means for forming a second header signal based on first information in the first header signal;

means for associating the payload signal with the second header signal to form a modified packet signal; and means for switching the modified packet signal based on second information in the first header signal.

* * * * *